INVENTOR.
ALFRED A. WRIDT, JR.
BY
Wilson, Settle & Craig
ATTORNEYS

United States Patent Office 3,342,274
Patented Sept. 19, 1967

3,342,274
SENSING RANGE ADJUSTMENT FOR DRAFT SENSING MECHANISM
Alfred A. Wridt, Jr., Racine, Wis., assignor to J. I. Case Company, Racine, Wis., a corporation of Wisconsin
Filed Feb. 11, 1965, Ser. No. 431,928
4 Claims. (Cl. 172—7)

ABSTRACT OF THE DISCLOSURE

A draft control system including a draft sensing mechanism for controlling the magnitude of draft exerted upon a tractor-drawn implement. The sensing mechanism includes at least one leaf spring connecting the implement to the tractor with an abutment and a cam assembly operable upon opposite ends of the spring to establish a minimum value for the sensing range of draft.

Background of the invention

The present invention relates generally to a draft control system for maintaining a generally constant draft on the tractor. More particularly, this invention relates to a system, including method and apparatus, for imposing a pre-load upon a draft sensing mechanism, interposed between a tractor and a tractor-drawn earth working implement of the agricultural or earth excavating type, to vary the sensing range of the sensing mechanism. Only the changes in draft which fall within the selected sensing range are measured and used as indicia for correcting the elevation of the implement.

Tractor-implement systems of the agricultural and earth excavating types are, at different times, called upon to perform several distinct operations, for example, cultivating and plowing, and earth moving and finished grading, respectively. Each operation normally imposes significantly different magnitudes of draft upon the tractor. Consequently, a draft sensing mechanism having only a single sensing range is inadequate to meet the modern need, while a draft sensing mechanism, used to sense draft variations, which is inherently responsive to all possible magnitudes of draft to which the tractor may be subjected would be so costly as to preclude successful commercial marketing.

In view of the foregoing, it is desired to provide a structurally simple, inexpensive, highly effective sensing range adjustment for a draft sensing mechanism, whereby the adjustment may be used to set the sensing mechanism for any desired sensing range commensurate with the tractor-implement operation to be performed.

The present invention provides such a sensing range adjustment system. In the preferred embodiment, a resilient, flexible, wishbone-shaped frame is interposed in tensile load transmitting relation between the lower links of the tractor and the implement. The sides of the wishbone-shaped frame comprise bowed or curved, tensile, draft-sensing leaf springs which transfer the implement draft to the tractor generally in directions along the respective chords extending between the ends of the spring as disclosed in co-pending United States application Ser. No. 424,004, filed Jan. 7, 1965, and assigned to the assignee of the present invention. The rear of the frame normally includes a cross shaft.

Interposed between the tractor housing and the forward ends of the leaf springs is a bracket-supported cam assembly including eccentric cams. To increase the sensing range, these eccentric cams are manually rotated through a predetermined number of degrees, which rotation causes the cross shaft of the wishbone-shaped frame to be biased against the forward face of slotted walls of two rigid, tractor-supported plates. This introduces a pre-load (pre-stress) into the wishbone-shaped frame, extending the length of the frame by moving the front end of the springs forward while the back end of the springs stationary, by reason of the engagement between the tractor-supported plates and the cross shaft. This deflects and changes the degree of curvature present in the springs. Thus, the draft-load imposed on the wishbone frame must exceed the pre-load being exerted on the wishbone-shaped sensing frame sufficient to move the cross-shaft away from the rigid tractor-supported plates before the springs are capable of responding to the draft. Hence, the amount of rotation of the eccentric cams, up to 180°, controls the sensning range of the leaf springs of the wishbone-shaped frame. Positive and negative changes in the draft within the sensing range causes a proportional change in the magnitude of spring deflection or spring degree of curvature. The changes in frame extension thereby caused or, alternatively, the changes in spring deflection or spring degree of curvature are measured and are normally used to actuate the conventional draft control system causing adjustment of the implement elevation so that the desired magnitude of draft is restored.

Accordingly, it is a primary object of this invention to provide a novel adjustment system, including method and apparatus, for varying the sensing range of a draft sensing mechanism of the type used to measure changes in the implement draft imposed on the tractor.

A further object of this invention is to provide an adjustment method and apparatus for imposing a desired pre-load upon a draft sensing mechanism, which pre-load sets the sensing range mechanism.

Another object is the provision, within a draft sensing system having a curved spring, of an adjustment apparatus including an eccentric cam assembly for pre-setting the sensing range of the spring. The adjustment apparatus may effectively: (1) eliminate variations in manufacturing tolerances; (2) maintain a constant preload on the spring once the adjustment apparatus has been placed in its desired position; and (3) insures that the draft sensing system will be responsive over the full sensing range once the spring has been pre-loaded to the desired sensing range.

Other objects and features of this invention will become apparent from the following description and appended claims in conjunction with the accompanying drawings, wherein:

Figure 1:
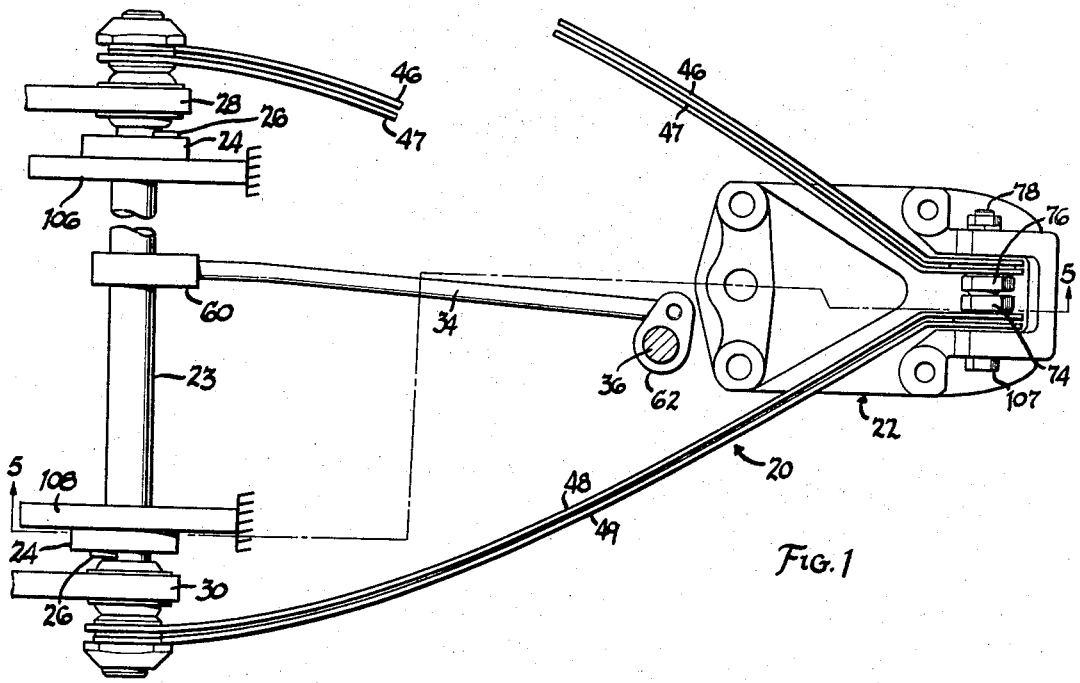
FIGURE 1 is a schematic plan view of a draft sensing device having two pairs of leaf springs forming a wishbone-shaped sensing frame and including a cross shaft and further illustrating a presently preferred sensing range adjustment apparatus of this invention.
Figure 5:
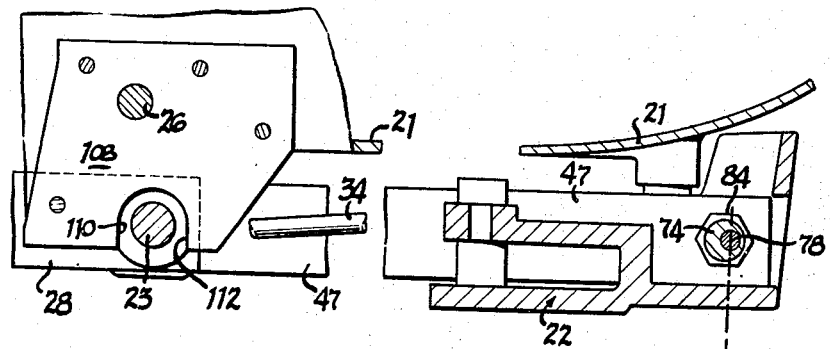
Figure 6:
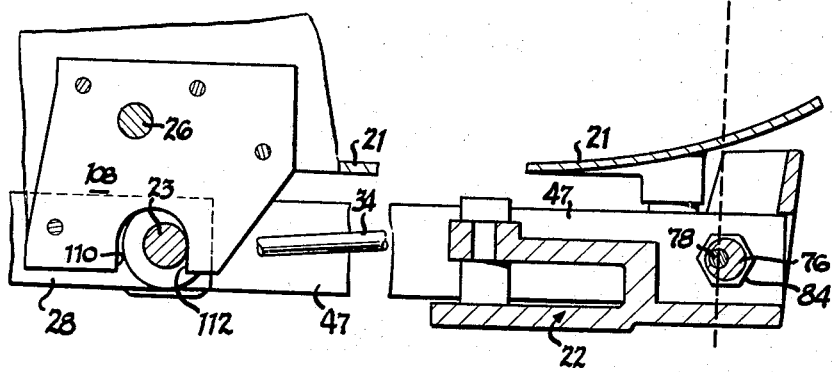

FIGURE 5 is a fragmentary side elevational view of the draft sensing apparatus of FIGURE 1 illustrating the eccentric cam assembly in a non-pre-loaded position with the cross shaft spaced away from the rear rigid abutment plates; and FIGURE 6 is a fragmentary side elevational view similar to FIGURE 5 of the draft sensing apparatus of FIGURE 1 illustrating the eccentric cam assembly in a pre-loaded position with the cross shaft engaging the rear rigid abutment plates.

Figure 2:
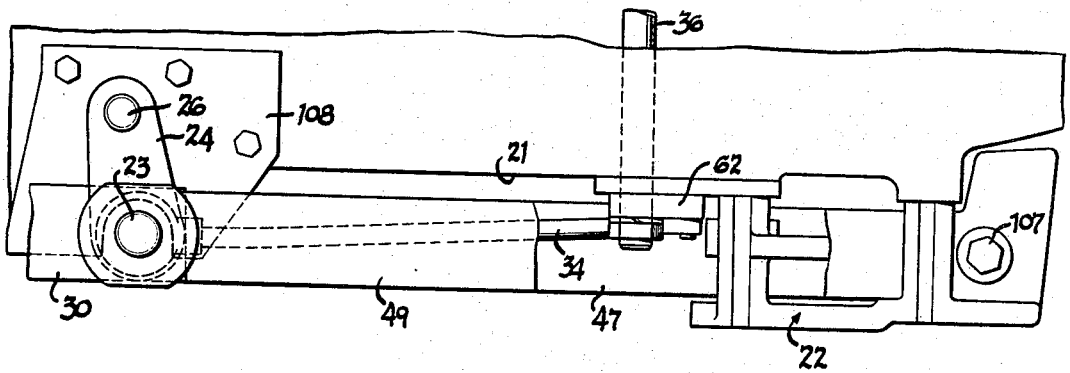
FIGURE 2 is a schematic side elevational view of the embodiment of FIGURE 1.

Referring now to the drawings wherein like numerals are used to designate like parts throughout, FIGURES 1 and 2 depict a presently preferred embodiment of this invention.

FIGURES 1 and 2, generally speaking, illustrate a flexible, resilient, wishbone-shaped draft sensing frame 20 interposed between the bottom of the tractor housing 21 and a tractor-drawn implement (not shown). The frame 20 is attached at the forward end to the tractor housing 21 by means of a bolt-fastened bracket 22, and at its back end to a cross shaft 23. Pivotable arms 24 rotatably carry the cross shaft 23, being aperture-connected to the cross shaft and pin-connected at 26. Draft arms 28 and 30 carried by the cross shaft 23 in a conventional manner are secured to the implement in the usual way and, thus, transmit the draft.

Changes in draft, with respect to whatever predetermined draft magnitude is desired for the particular tractor-implement operation being performed, varies the degree of the extension of the draft sensing frame 20, which variation is measured by the fore and aft displacement of the cross shaft 23. A draft control rod 34, nonrotatably fastened to the cross shaft 23, is responsive to such displacement of the cross shaft 23 causing rotation of a draft signal shaft 36, which is normally used to change the setting of a draft control mechanism (not shown) to either lift or lower the draft arms 28 and 30 thereby varying the elevation of the implement and restoring the predetermined magnitude of draft.

The construction and operation of the draft control mechanism is well known in the art and need not be further described in this specification. Reference may be made to co-pending United States application Ser. No. 424,004, assigned to the assignee of this invention, for further detail of the structure and operation of such a draft control mechanism.

More specifically, each change in the degree of extension which occurs in the sensing frame 20 responsive to changes, either positive or negative, in the magnitude of draft with respect to the predetermined draft is attained by means of two pairs of bowed or curved tension springs 46, 47 and 48, 49 which converge to an apex at the tractor-bracket 22. As observed by inspection of FIGURE 1, in combination, leaf springs 46, 47 and 48, 49 along with the cross shaft 23 comprise the frame 20, which is a generally flexible, wishbone-shaped assembly. The degree of curvature present in each of the springs 46, 47 and 48, 49 is proportional, though not directly proportional, to the magnitude of draft exerted upon the wishbone-shaped sensing frame 20 by the implement through the draft arms 28 and 30, and/or the magnitude of pre-load present in the spring. As the tractor pulls the implement, in the absence of any pre-loading, the leaf springs 46, 47 and 48, 49 will tend to straighten out, changing the degree of curvature of the springs an amount proportional to each variation in draft exerted upon the tractor. The draft induced force is transmitted through the springs 46, 47 and 48, 49, being tensile and being generally directed along the chord between the ends of each spring to create the described change in degree of curvature or straightening out phenomenon.

Frame 20, being rigidly fastened at bracket 22 to the tractor, is extended or lengthened along the axis between the tractor and the implement in the direction of travel when subjected to the draft an amount proportional to the draft load by reason of the above-described change in curvature of springs 46, 47 and 48, 49. Having once assumed an initial position responsive to imposition of the desired predetermined draft being imposed upon the sensing frame 20, each positive or negative change in draft with similarly change the degree of curvature or the amount of extension of the leaf springs 46, 47 and 48, 49. Accordingly, the overall extent or length of the frame 20 will be altered. The conventional draft control mechanism (not shown), responsive to the frame 20, will hold the draft arms 28 and 30 in a constant fixed position when frame 20 is being subjected to the desired predetermined draft. Any positive or negative change in the draft, away from the predetermined value, will cause a corresponding change in the degree of curvature or extension of the leaf springs 46, 47 and 48, 49 resulting in a corresponding displacement of the cross shaft 23, either fore or aft depending upon whether the change in draft is positive or negative. Each such displacement of the cross shaft 23 will displace the draft control rod 34 an identical distance by reason of the fact that rod 34 is integrally attached to the cross shaft 23 near its center by a coupling 60.

Displacement of the draft control rod 34 rotates a pivotable link 62 and the draft signal shaft 36 which actuates the draft control mechanism. Actuation of the draft control mechanism will serve to either raise or lower draft arms 28 and 30 depending upon the direction of rotation of the draft signal shaft 36. As mentioned earlier, a more detailed description of this draft control operation may be had by reference to the specification of co-pending application Ser. No. 424,004.

When a draft, exerted upon a wishbone-shaped frame 20, is greater than the desired magnitude of draft, the springs 46, 47 and 48, 49 will be extended somewhat reducing the degree of curvature in each spring and causing the draft control rod 34 to be displaced toward the implement. This rotates the draft signal shaft 36 counterclockwise, as viewed in FIGURE 1, and accommodates lifting of the draft arms 28 and 30 thereby raising the implement.

It is to be observed that the sensitivity of the wishbone-shaped draft sensing frame 20 is a variable, depending on the degree to which the leaf springs 46, 47 and 48, 49 are deflected or straightened out by reason of whatever predetermined draft valve is desired to be imposed thereon. The load-response characteristics of the leaf springs 46, 47 and 48, 49 are such that an exponential variation in draft is required to produce a uniform incremental amount of deflection or change in degree of curvature in the leaf springs. Thus, the change in draft load imposed upon the wishbone-shaped frame 20, necessary to effect a uniform incremental change in deflection, increases with an increase in the magnitude of the load.

In practice, this means that the wishbone-shaped draft sensing frame 20 will be significantly more sensitive to tractor-implement operations necessitating imposition of only a relatively small magnitude of draft-induced load on the sensing frame, for example, when the implement being drawn by the tractor is a cultivator. Thus, relatively small changes in draft away from the desired cultivating magnitude will be sensed by the wishbone-shaped draft sensing frame 20 to actuate the draft control mechanism (not shown) in the manner previously described thereby quickly readjusting the position of the draft arms 28 and 30 which control the elevation of the implement being drawn.

However, when the draft-induced load imposed upon the draft sensing frame 20 is relatively high as, for example, when the implement being drawn by the tractor is a multi-bottom plow, the leaf springs 46, 47 and 48, 49, being significantly deflected or straightened out, will not respond to relatively small changes in draft. Hence, a significantly larger change in draft is required under these conditions to actuate the draft control mechanism (not shown) to effect change in the elevation of the draft arms 28 and 30 and, accordingly, change the elevation of the implement. Thus, for example, slight increases in soil resistance periodically encountered will not cause the plow bottom to undulate and thereby will accommodate improved contour plowing, tending to maintain a constant depth of plow but operable to prohibit over-taxing of the tractor. Therefore, when the draft being sensed is relatively high, significant changes in draft will be sensed by the draft sensing frame 20, for example, when the plow strikes an earth bound obstacle. The significant increase in draft magnitude thus created will cause the draft control mechanism (not shown) to quickly respond elevating the implement through the draft arms 28 and 30 to avoid damage to the plow and the like.

Inasmuch as commercially marketable draft sensing mechanisms are not inherently sensitive to all ranges of draft which may be imposed by the several possible tractor-implement operations, a sensing range adjustment system is required to correlate the sensing range of the draft sensing mechanism with the magnitudes of draft exerted upon the tractor by the particular tractor-implement operation being performed.

The present invention features a sensing range adjustment system, including method and apparatus, for a draft sensing mechanism, preferably of the flexible frame type previously described.

The preferred sensing range adjustment system provides inexpensive structure and manipulative steps which may be effectively utilized to pre-load the sensing frame in a direction generally opposite to the draft load. This preloading establishes the initial sensing point and the full sensing range at which the sensing frame will be responsive to the draft commenserate with the tractor-implement operation being performed.

In the preferred embodiment, an eccentric cam assembly 70 (FIGURE 3) is interposed between the tractor housing and forward ends of the leaf springs 46, 47 and 48, 49 with the bracket 22 carrying the cam assembly upon a nut and bolt assembly 72. The cam assembly 70 is utilized to pre-load the wish-bone-shaped sensing frame 20, the exact operation of which will be described following a description of the structure of the cam assembly 70.

Figure 3:
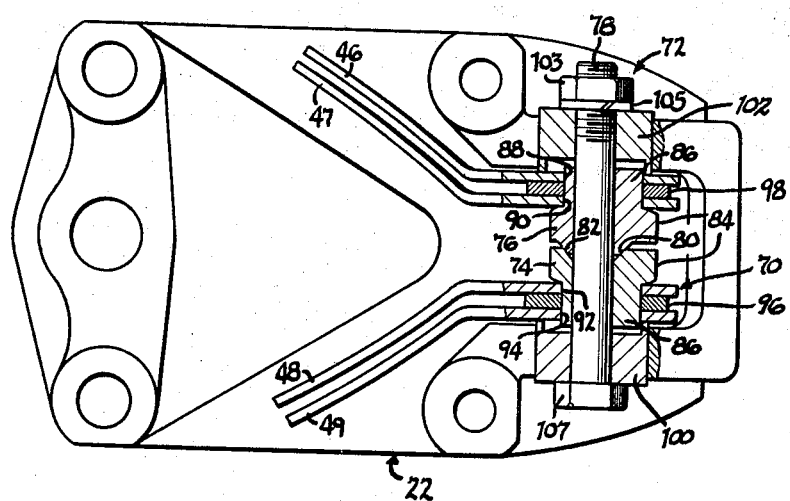
FIGURE 3 is an enlarged plan view illustrating a bracket-supported eccentric cam assembly which forms part of the sensing range adjustment apparatus depicted in FIGURE 1.
Figure 4:
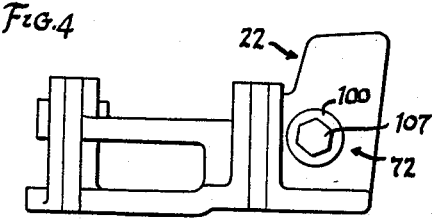
FIGURE 4 is a side elevational view of the bracket which supports the eccentric cam assembly depicted in FIGURE 3.

The cam assembly 70, as best illustrated in FIGURE 3 comprises a pair of eccentric cams 74 and 76 each of which is eccentrically rotatably mounted upon the shank of a bolt 78 of the nut and bolt assembly 72. To insure unitary movement of the cams, the cam 74 is provided with tapered recess 80 on one side into which is fitted a tapered projection 82 of the other cam 76. Each cam 74 and 76 is provided with a hexagonal peripheral surface 84 upon which a wrench may be fitted for eccentrically rotating the cams upon the bolt 78. The cams 74 and 76 each have a generally cylindrical outward projection 86 which fits through apertures 80, 90 and 92, 94 of the leaf springs 46, 47 and 48, 49, respectively, in the illustrated assembled position. A pair of spacers 96 and 98 hold the springs 46, 47 and 48, 49, respectively, in fixed spaced relation. Retainers 100 and 102 are, respectively, biased between the nut 103 and lock washer 105 and the spring 46, and the bolt head 107 and the leaf spring 49 to complete the eccentric cam assembly 70. Eccentric rotation of the cam 74 and 76, either clockwise or counter-clockwise, will, accordingly, displace the forward ends of the springs 46, 47 and 48, 49 fore or aft.

As best illustrated in FIGURES 5 and 6, fixed to the bottom of the tractor housing 21 at integral connections are a pair of slotted plates 106 and 108. The cross shaft 23 of the frame 20 is situated within the slots 110 of the plates 106 and 108. With reference to the orientation of FIGURE 5, when the eccentric cams 74 and 76 are rotated such that the centerline longitudinal axis of the cams is eccentrically behind the centerline of the bolt 78, the cross shaft 23 is spacedly located within the slots 110 of the plates 106 and 108 away from a forward wall 112 slot. However, when the eccentric cams 74 and 76 are rotated such that the centerline longitudinal axis of the cams is eccentrically forward of the centerline of the bolt 78, which is static as indicated by line 77, the cross shaft 23 is biased in surface-to-surface engagement with the forward wall 112 of the slots 110 as springs 46, 47 and 48, 49 are extended or straightened out as the forward ends thereof travel with the cams. This position is illustrated in FIGURE 6. Here, the plates 106 and 108 induce the maximum pre-load upon the cross shaft 23 by reason of the described surface-to-surface engagement between the cross shaft 23 and wall 112. Of course, the cams 74 and 76 may be rotated so as to be situated in any position intermediate of the two positions illustrated in FIGURES 5 and 6 thereby accommodating pre-loading of the cross shaft 23 to magnitudes less than the maximum. The bolt of the nut and bolt assembly 72 is generally loosened to accommodate easy rotation of the cams 74 and 76 while they are being adjusted to their desired position. Following adjustment of the cams, the nut 103 of the nut and bolt assembly 72 is again tightened against the lock nut 105 to rigidly secure the eccentric cam assembly 70 in the desired position.

Thus, in this manner the wishbone-shaped flexible frame 20 is pre-loaded in a direction generally opposed to the draft exerted upon the frame 20 a selective amount sufficient to extend the flexible frame by deflecting or decreasing the degree of curvature present in the leaf springs 46, 47 and 48, 49 to thereby establish whatever desired sensing range is necessary. The beginning sensing point of the established sensing range is equal to the magnitude of pre-load exerted by the cross shaft 23 against the slotted tractor-supported plates 106 and 108. When the draft load imposed on the wishbone-shaped frame 20 exceeds the pre-load placed upon the frame, by reason of rotation of the eccentric cams 74 and 76 bringing the cross shaft 23 into forced transmitting surface-to-surface contact with the slotted tractor-supported plates 106 and 108, an amount sufficient to move the cross shaft away from the rigid tractor-supported plates, the springs are then capable of responding to the draft and of generating signals to the draft control mechanism (not shown) for varying the elevation of the implement.

Thus, the above-described mechanism and method manipulation utilized to pre-load the sensing frame effectively nullifies any tolerance variations in the structural components, will maintain a constant pre-load on the sensing frame once the cam assembly adjustment apparatus has been secured in the desired position, and insures that the draft sensing system will be responsive to draft variations over the full width of the slots 110 in the rigid tractor-supported slotted plates 106 and 108. This last feature insures the availability of the maximum sensing range.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an apparatus for controlling the magnitude of draft exerted upon a tractor by a tractor-drawn earth working implement and the like, a draft sensing mechanism comprising a wishbone-shaped, resilient frame assembly interposed in draft-load transmitting relation between the implement and the tractor, means for elongating said frame assembly to establish a minimum value for a desired sensing range, said means comprising an abutment engageable by one end of said frame assembly and a rotatable eccentric cam assembly engaging the opposite end of said frame assembly, means for measuring changes in spring deflection which fall within a selected sensing range exceeding the minimum value, means for generating a draft control signal proportional to each major change in spring displacement and means for changing the elevation of the implement an amount proportional to the draft control signal.

2. In an apparatus for controlling the magnitude of draft within a selected sensing range exerted upon a tractor by a tractor-drawn earth implement and the like, a draft sensing mechanism interposed in tensile load transmitting relation between the implement and the tractor, said draft sensing mechanism comprising a wishbone-shaped assembly including at least two leaf springs deflectible an amount proportional to the imposed draft load within the sensing range, means for elongating said springs to establish a minimum value for a desired sensing range, said means including an eccentric cam assembly operable upon one end of said springs and an abutment engageable by the opposite end of said springs whereby movement of said eccentric cam assembly will establish said minimum value, means responsive to changes in spring deflection caused by changes in draft within the sensing range, means for generating a draft control signal proportional to each change in spring deflection and means for changing the elevation of the implement an amount essentially proportional to each draft control signal.

3. In an apparatus for controlling the magnitude of draft within a selected sensing range exerted upon a tractor by a tractor-drawn earth implement and the like, a draft sensing mechanism interposed in tensile load transferring relation between the implement and the tractor, said draft sensing mechanism comprising a wishbone-shaped assembly including at least two leaf springs deflectible an amount proportional to the imposed draft-load within the sensing range, a cross-shaft joining the rear ends of said leaf springs, a tractor-supported abutment adjacent said shaft, and means movably supporting the forward ends of said springs and including a cam assembly having at least one eccentric cam operable to bias said cross-shaft against said tractor-supported abutment to pre-load said springs an amount requisite to establishing the sensing range.

4. In an apparatus for controlling the magnitude of draft exerted upon a tractor-drawn implement and the like, a draft sensing mechanism comprising a curved leaf spring having opposite ends respectively connected to the implement and tractor, means for pre-stressing the spring generally along a chord between the ends of the leaf spring to establish a desired sensing range, said means including an eccentric cam incorporated in one of the end connections and an abutment engageable by the other end connection whereby rotation of said eccentric cam will elongate said spring to make the spring insensitive to changes in draft below the desired sensing range, means for measuring changes in spring deflection which fall within the desired sensing range and means for generating a signal proportional to the measured changes in spring deflection.

References Cited

UNITED STATES PATENTS

| | | | |
|---|---|---|---|
| 3,022,831 | 2/1962 | Hess | 172—7 |
| 3,246,702 | 4/1966 | Carlin | 172—10 |
| 3,294,179 | 12/1966 | Bunting et al. | 172—7 X |

ABRAHAM G. STONE, *Primary Examiner.*

W. A. SMITH III, *Assistant Examiner.*